US008065265B2

(12) United States Patent
Wang et al.

(10) Patent No.: US 8,065,265 B2
(45) Date of Patent: Nov. 22, 2011

(54) METHODS AND APPARATUS FOR WEB-BASED RESEARCH

(75) Inventors: Esther Hsiu-Meng Wang, Redmond, WA (US); Anthony Xavier Francisco, Woodinville, WA (US); Charles Joseph Coplen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 11/926,956

(22) Filed: Oct. 29, 2007

(65) Prior Publication Data

US 2009/0112842 A1  Apr. 30, 2009

(51) Int. Cl.
*G06F 17/00* (2006.01)
(52) U.S. Cl. ......... 707/608; 707/706; 707/751; 707/769
(58) Field of Classification Search .............. 707/1, 705, 707/740, 706, 608, 751, 769
See application file for complete search history.

(56) References Cited

U.S. PATENT DOCUMENTS

| 6,321,228 | B1  |   11/2001 | Crandall et al.         |
|-----------|-----|-----------|--------------------------|
| 6,718,324 | B2  |    4/2004 | Edlund et al.           |
| 6,985,894 | B2* |    1/2006 | Ebata ............... 707/3 |
| 7,024,404 | B1  |    4/2006 | Gerasoulis et al.       |
| 7,363,309 | B1* |    4/2008 | Waite et al. ......... 707/101 |
| 7,860,871 | B2* |   12/2010 | Ramer et al. ......... 707/751 |
| 2003/0037074 | A1 | 2/2003 | Dwork et al.            |
| 2004/0031058 | A1* | 2/2004 | Reisman ............ 725/112 |
| 2004/0070606 | A1 | 4/2004 | Yang et al.             |
| 2005/0160107 | A1 | 7/2005 | Liang                    |
| 2005/0273706 | A1 | 12/2005 | Manber et al.           |
| 2007/0100779 | A1 | 5/2007 | Levy et al.             |
| 2007/0255631 | A1* | 11/2007 | Schmidt et al. ........ 705/27 |
| 2009/0254971 | A1* | 10/2009 | Herz et al. ............ 705/1 |

FOREIGN PATENT DOCUMENTS

WO  WO2007029348 A1  3/2007

OTHER PUBLICATIONS

Data Collection Methods on the Web for Infometric Purposes—A Review and Analysis http://www.ingentaconnect.com/content/klu/scie/2001/00000050/00000001/00316646, 1 pg.
Fab: Content-Based, Collaborative Recommendation http://delivery.acm.org/10.1145/250000/245124/p66-balabanovic.pdf?key1=245124&key2=5856627811&coll=GUIDE&dl=GUIDE&CFID=31918581&CFTOKEN=13689637, pp. 66-72.
Li Ding et al., "Swoogle: A Search and Metadata Engine for the Semantic Web", *CIKM*, pp. 652-659, Nov. 2004.
Oren Zamir et al., "Grouper: A Dynamic Clustering Interface to Web Search Results", printed at http://www8.org/w8-papers/3a-search-query/dynamic/dynamic.html , pp. 1-16.

* cited by examiner

*Primary Examiner* — Rehana Perveen
*Assistant Examiner* — Tiffany Thuy Bui
(74) *Attorney, Agent, or Firm* — Wolf, Greenfield & Sacks, P.C.

(57) ABSTRACT

A method and apparatus for facilitating web-based research among a community of users. Templates created by at least one user within the community may be modified by another user to facilitate further research on a item, such as a product and/or service, associated with the template. The modified template may be populated with data collected from at least one website and organized in such a manner so as to facilitate making a decision about the item.

14 Claims, 6 Drawing Sheets

METHODS AND APPARATUS FOR WEB-BASED RESEARCH

BACKGROUND OF THE INVENTION

1. Field of the Invention

The present invention relates to web-based research.

2. Discussion of the Related Art

The global accessibility of the Internet has enabled users to access information related to a wide variety of products and services from around the world. To collect information about a desired product or service, users may use web browsers to view the contents of web pages on the World Wide Web. The amount of information available on the World Wide Web is vast. To identify web pages that may contain potentially useful information, users may additionally employ a computer-implemented search program known as a search engine. A search engine reads keywords that a user enters into a user interface, locates the keywords in web pages published on a computer running a World Wide Web server process, and provides access to the web pages containing the keywords.

SUMMARY OF THE INVENTION

Embodiments of the present invention are directed toward a method and an apparatus for performing and/or facilitating web-based research. Applicants have appreciated that collecting and organizing data from web sources is often a time-consuming and cumbersome process. While search engines may be useful for directing users to particular web pages that may contain relevant data for which the user was searching, Applicants have appreciated that the available tools for organizing the collected data are somewhat limited, and often times unsatisfactory. For example, users may save links to various visited web pages in a web browser's history or favorites list, but capturing the relevant information from each of the web pages may be difficult.

Applicants have also appreciated that searching for information on items with which a user is unfamiliar can also be difficult. For example, if a user wishes to purchase a bass guitar as a gift for a friend, and they themselves have little or no experience with bass guitars, it may be difficult for the user to determine what attributes of the guitar are most important to consider when buying the guitar. Applicants have further appreciated that there may be other users that have already searched for bass guitars on the web, and may know what the important attributes are, as well as useful websites to search as a starting point for further research. Therefore, some embodiments of the present invention provide a forum of community users in which data collected from various websites related to an area of research can be shared among the community of users.

In one embodiment, a method is provided for conducting web-based research on at least one item, such as a product or service. The method is performed by a first user who accesses a previously populated research template for the item. The previously-populated template comprises at least one field relating to an attribute for evaluating the item, wherein the attribute was specified by at least one other user. The field was populated with results of research conducted on the item by the at least one other user, with the results comprising data collected from at least one website. The first user modifies the research template by modifying the attribute, and populates the modified template with data collected from at least one website.

Another embodiment of the invention provides a method of facilitating web-based research on at least one item. The method comprises an act of providing a first user access to a previously populated research template for the at least one item. The previously populated template comprises at least one field relating to at least one attribute for evaluating the item, wherein the attribute was specified by at least one other user. The at least one field was populated with results of research conducted on the item by the at least one other user, with the results comprising data collected from at least one website. In response to at least one instruction from the first user, the research template is modified by modifying the attribute, and in response to at least one action by the first user, the modified template is populated with data collected from at least one website.

In another embodiment of the invention, a computer readable medium may include instructions, that when executed on a computer system, perform the above-described method of facilitating web-based research.

These and other aspects of the invention will be apparent from the following detailed description and claims.

BRIEF DESCRIPTION OF THE DRAWINGS

Aspects of the invention are described with reference to illustrative embodiments and the following drawings in which like numerals reference like elements, and wherein.

DETAILED DESCRIPTION

Figure 1:
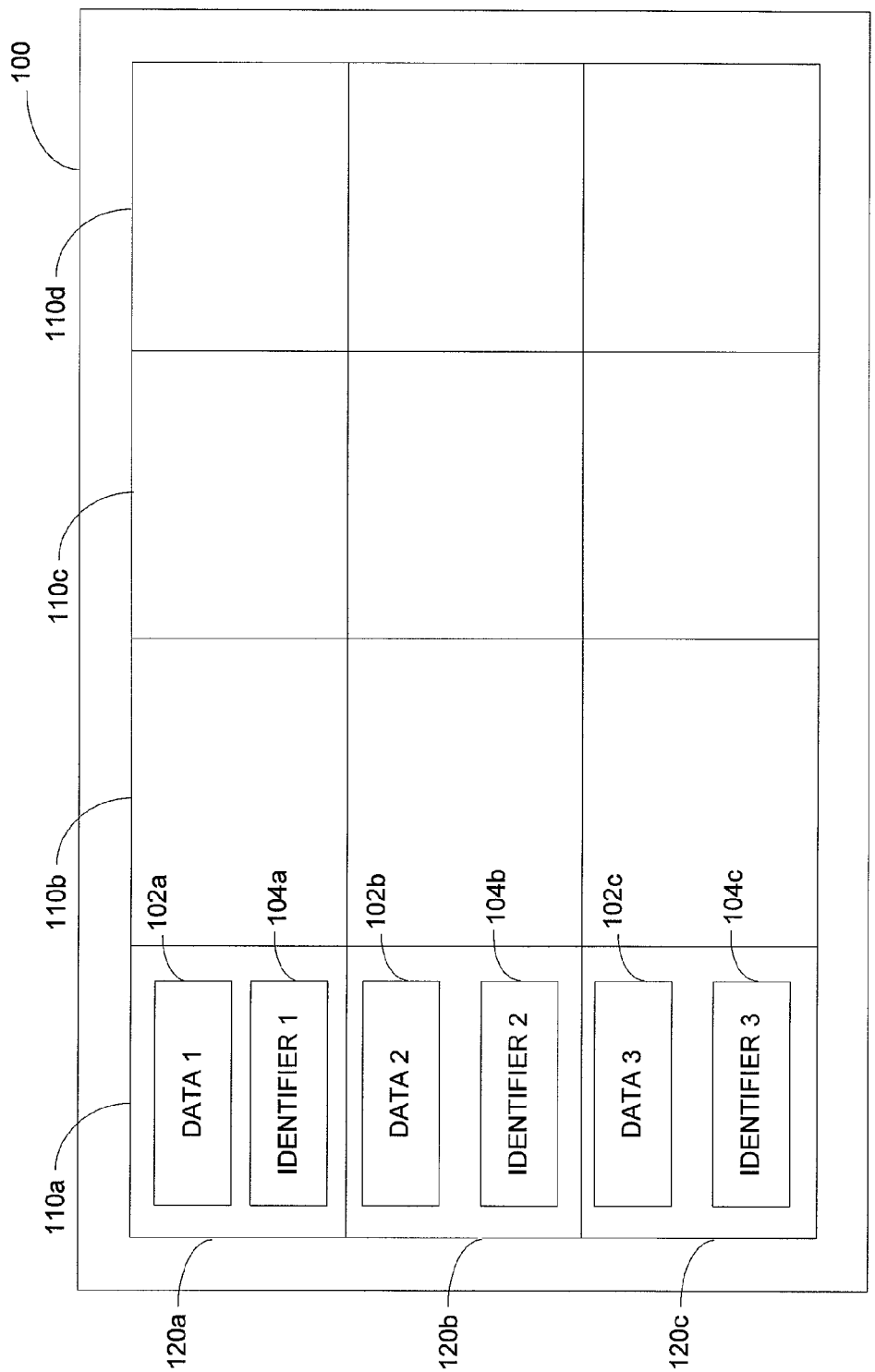
FIG. 1 is a schematic representation of an illustrative research template that can be created and/or used in accordance with embodiments of the invention.

Applicants have appreciated that data collected while researching a product or service on the Internet is often difficult to collect, organize, and present in a way that facilitates making an informed decision based on the research. Given the large amount of data that may be collected on a particular product or service, previous methods of organizing data (e.g., browser features such as bookmarks and history lists, or manual processes such as entering data into spreadsheets, word processing software, or taking notes on paper) are often unsatisfactory. In addition, studies have shown that gathering information from the web is an integral part of many users' job functions, yet is considered by most to be time consuming and complex. It often requires navigating multiple links and web sites, and scanning large amounts of material to assess relevance, with the process unfolding over days or weeks.

Embodiments of the present invention provide users with the ability to collect data across different web sites so they can organize, compare, and analyze data based on any desired criteria. Some embodiments involve defining a (or using a previously defined) template comprising one or more fields corresponding to one or more attributes of a product or service for which research is being performed. For example, if the product being researched is a bicycle, the attributes may include, "Price," "Color," "Frame Material, and "Shipping Availability." A user may browse one or more web pages related to bicycles and gather information from each of the web pages on various bicycles and/or retailers. The gathered information may relate to attributes defined in the template, and the information from the web sites may be included in the template.

Information may be gathered from a web page in any suitable way, as embodiments of the invention are not limited in this respect. For example, a user may view a web page, and may cut and paste the data from a web page into a template using an input device such as a keyboard, a mouse, or any other input device. In other embodiments, a user may manually enter the values for each attribute into the template. In alternate embodiments discussed below, some (or all) information can be automatically extracted from a web page using any suitable technique, examples of which are discussed below, so the user does not need to do so manually.

In some embodiments, one or more techniques may be used to automatically extract the values of the desired attributes from a web page, without significant interaction from a user. In one embodiment, should the one or more techniques fail to successfully identify values in the web page corresponding to one or more desired attributes, the user may manually select the information on the web page and transfer it to the template using any appropriate means as discussed above. The user may also provide information, such as a mapping function between the desired data and the manually selected data, to the one or more techniques to improve the techniques' ability to successfully extract information from web pages. The foregoing examples of ways for gathering data from a web page are provided merely for illustrative purposes, and the invention is not limited to using those or any other specific techniques.

Figure 2:
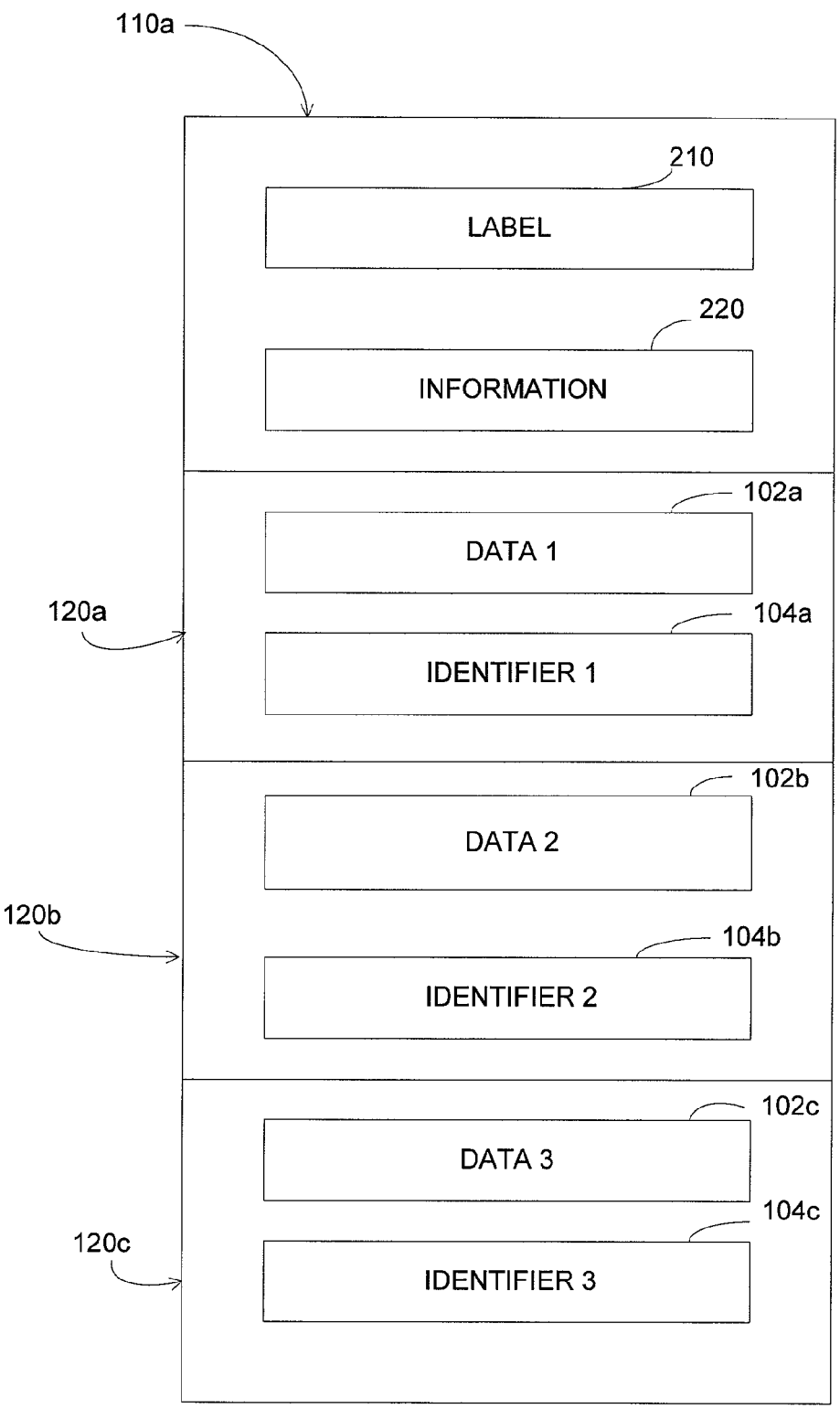
FIG. 2 is a schematic representation of one illustrative attribute from the template of FIG. 1.

As mentioned above, some embodiments are directed to a research template. The template can take any form, as embodiments of the invention are not limited in this respect. In one embodiment illustrated in FIGS. 1 and 2, the template 100 may comprise a table, wherein the columns 110a-110d represent individual attributes, the rows 120a-120c represent items on which research as been performed, and wherein the entry for an attribute in each row includes data 102a collected from one or more web pages, and optionally an identifier 104a of the web source of the data. For example, each row can include data from one website. Alternatively, each row can include data for one product (e.g., with data from different web sites). Although only four columns representing four attributes are illustrated in FIG. 1, it should be appreciated that any number of columns may be specified in the template. Similarly, although only three rows are illustrated in FIG. 1, it should be appreciated that any number of rows may be specified in the template. One illustrative embodiment of a column (e.g., 110a) in the template is illustrated in FIG. 2. Each column may include a label 210 identifying the associated attribute, and data (e.g., 102a, 102b, 102c) collected from a web site. The column can be structured in any suitable way, as the invention is not limited in this respect.

In accordance with one embodiment, when the data from a web page is transferred to the template, information may be maintained (e.g., in the template or elsewhere) associating the web page from which the data was selected with the corresponding entry in the template, and optionally the section of the web page from which the information was collected may also be identified. This can be done in any suitable way, as the invention is not limited in this respect. For example, in some embodiments, an identifier of the section of the website from which the data was selected (e.g., 104a) may reference a tag in a web page document written in a markup language such as hypertext markup language (HTML) or extensible markup language (XML) or any other appropriate language. Alternatively, the identifier may be a microformat. Microformats are tags that are attached to a web source that enable a web page developer to associate simple identifying codes with specific kinds of data in a web page. It should be appreciated that the identifiers described above are merely examples, and the aspects of the present invention described herein are not limited in this respect, as any suitable identifier may be used to identify the section of the website from which data is selected.

In some embodiments, the identifiers may be used to facilitate an automatic update of the data in the relevant fields of the template based upon updates to a web page. The update can be done in any suitable way, as the invention is not limited in this way. For example, in one embodiment, if a user revisits a web page, a technique can detect changes based on comparing the information in the template with information at a location on the web page referenced by an identifier. A user could be notified in any suitable way that the template data is outdated, and optionally may identify which field(s) should be updated. In other embodiments, the update may be automatic, such that a technique can use the identifiers to facilitate detecting one or more fields in the template that are outdated, and the technique can automatically update the one or more outdated fields with data from the web page. In alternative embodiments, a background process could use the identifiers for sources of data in the template to revisit websites to detect any updates so that the user need not do so. In one embodiment, if an update is detected, the user may be notified in any suitable way, so that the user can revisit the associated web page to manually update the corresponding entry in the template. Alternatively, in embodiments wherein the capability of achieving an update automatically is provided, the one or more outdated fields in the template may be automatically updated, and a notification of the update may be delivered to the user in any suitable way.

Applicants have appreciated that users may wish to rank the results of their research based on each attribute's relative importance to the research. In some embodiments of the invention, users may assign weighting factors, ranges, or other suitable information 220 indicating the relative importance of each of the attributes defined in the template. For example, if a user considered "Price" as the most important attribute, and "Shipping Availability" as the second most important attribute, the user may define the weighting factors and/or ranges for the attributes "Price" and "Shipping Availability" as, "Price under $1000 is 'very important'", and "Available to ship within 1 week is 'somewhat important'." After collection of data from one or more web pages, the researched products or services from each web page may be organized according to the assigned weighting factors, ranges, or other information indicating the relative importance applied to the various attributes to help the user make a decision based on the preferences they have specified. For example, the user can sort the data based on which attributes the user designates as most important. Organization of the information in the template can be done in any suitable way, as the foregoing discussion merely provides examples, and the invention is not limited in this respect. In addition, it should be appreciated that the information indicating the relative importance of the attributes can be provided in any suitable way, having any desired number and degree of relative importance, as the invention is not limited in this respect.

Applicants have appreciated that a user may wish to export data from a template into another program for additional processing. Processing of information (i.e., content) in or associated with a template can be done in any way, as the invention is not limited in this respect. For example, in one embodiment, the data from a template may be transferred to another computer software program for further processing analysis. For example, the data could be transferred to a spreadsheet application to create a plot of one or more of the attribute values across different web pages as represented in the collected data. In another example, a user may have researched different houses, and wishes to determine where they are located in proximity to each other, and how far each of them is from the user's place of employment. In this situation, the data could be transferred to a mapping program (e.g., Microsoft LiveMap) to display the locations and commute distances and times from each house to the user's workplace. These are merely examples, and it should be appreciated that the data could also be transferred to a variety of other software programs for analysis or further processing, as the invention is not limited in this respect.

Applicants have further appreciated that multiple users may conduct research on similar products or services and that the collective researching experience of a community of users might benefit the community as a whole. To this end, some embodiments of the present invention support the development of a community of users who have access to one or more research templates defined and/or populated by members of the community. Enabling a community to share research can provide a number of benefits. For example, in one embodiment, a user can view a template created by another user. Viewing the attributes evaluated by other users (with optional weighting factors) can be valuable (e.g., to users inexperienced with a product or service who may not appreciate all of the attributes to be considered, or others). In another embodiment, the actual research results may also be made available to the community, either based upon research done by individual users or as a result of the collective research efforts of multiple users.

Applicants appreciate that some research communities exist, but they typically involve simply opinions on a product or service. By contrast, one embodiment of the invention provides data from research on which users can form their own opinions.

Figure 3:
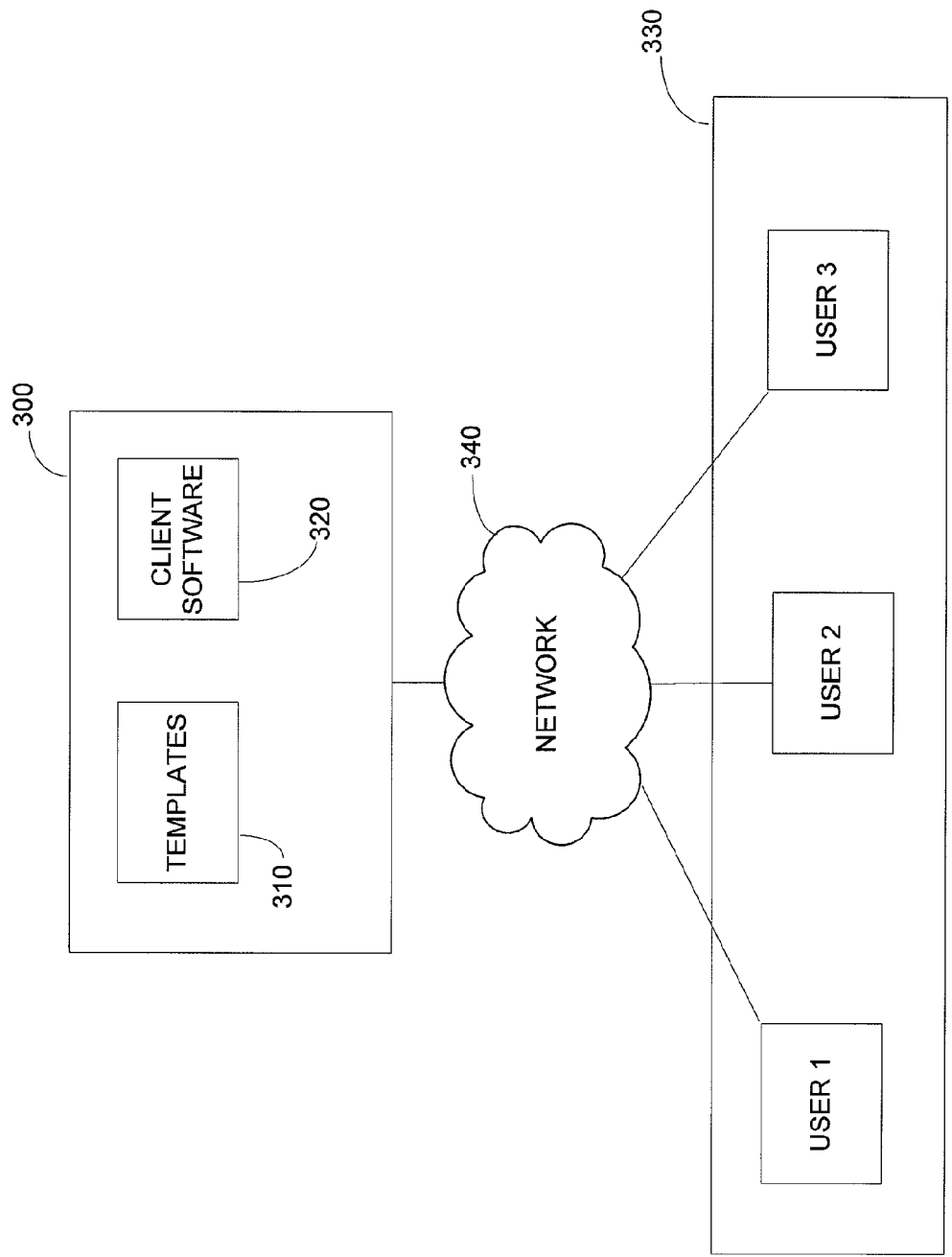
FIG. 3 is a schematic of a community of users that can be created to share research results in accordance with one embodiment of the invention.
Figure 4:
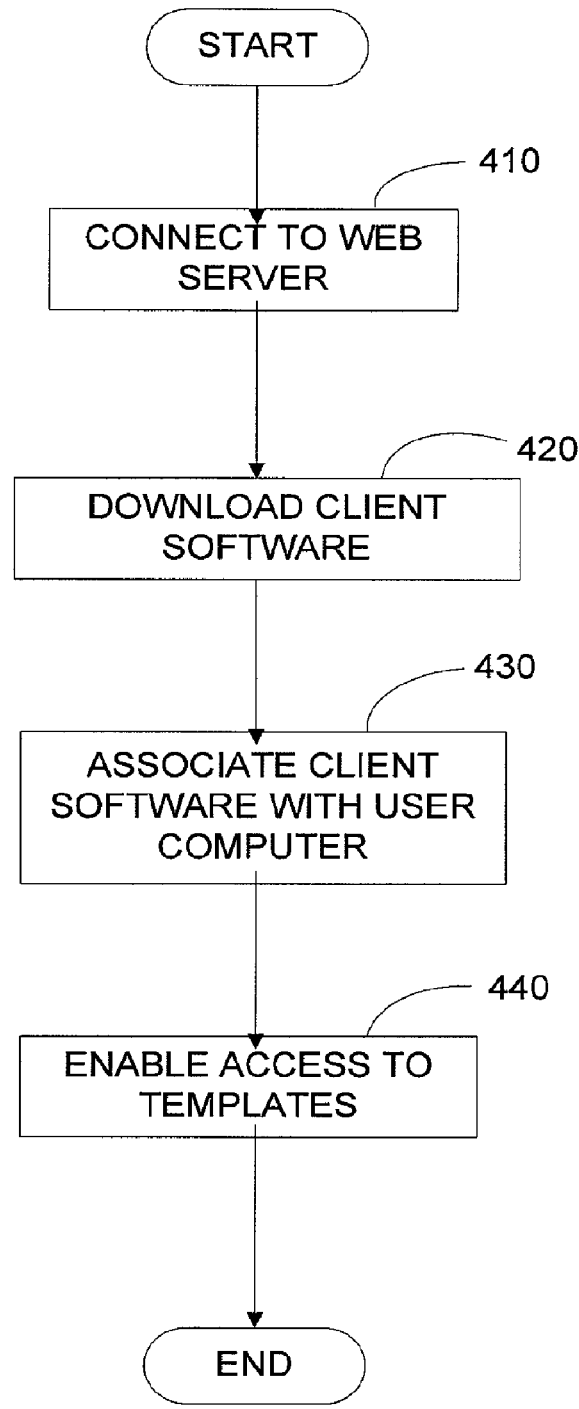
FIG. 4 is a flow chart of a method for enabling access to research templates stored on a web server in accordance with one embodiment of the invention.

Research templates may be made available to a community of users in any suitable way, as the invention is not limited in this respect. For example, in one embodiment, shown in FIG. 3, community users 330 may locate and download templates 310 from a repository 300, for example, a web server, via a network 340. To gain access to the centralized repository 300 and to allow users to create new templates and modify existing templates, users may download client software 320 from the web server or acquire it in any other suitable way (e.g., in an email attachment, via a file transfer protocol (FTP) client, or some other way). The client software may consist of, for example, an add-in for a web browser. Alternatively, the client software may consist of a stand-alone application that when executed on a client computer facilitates providing access to the shared repository of templates and the processes of adding and modifying templates. It should be appreciated that the foregoing examples of client software are described simply by way of illustration, as other techniques are possible. One embodiment of a method for enabling user access to the community network is shown as a series of acts in FIG. 4. In act 410, the user connects to a web server via any appropriate network protocol. Then in act 420, the user may download a copy of the client software to the user's computer. To activate the client software, the software must be associated with the user's computer in any appropriate way (act 430), so as to identify the user as belonging to the community of users. The web server is then informed that the user is a member of the community of users (act 440), and enables access to the stored templates.

In other embodiments, templates may be shared between community users in any other suitable way (e.g., by sending one or more templates in an email or email attachment, by transmitting one or more templates from the computer of one user to the computer of another user via an FTP client, or any other suitable way), as the invention is not limited in this regard.

Figure 5:
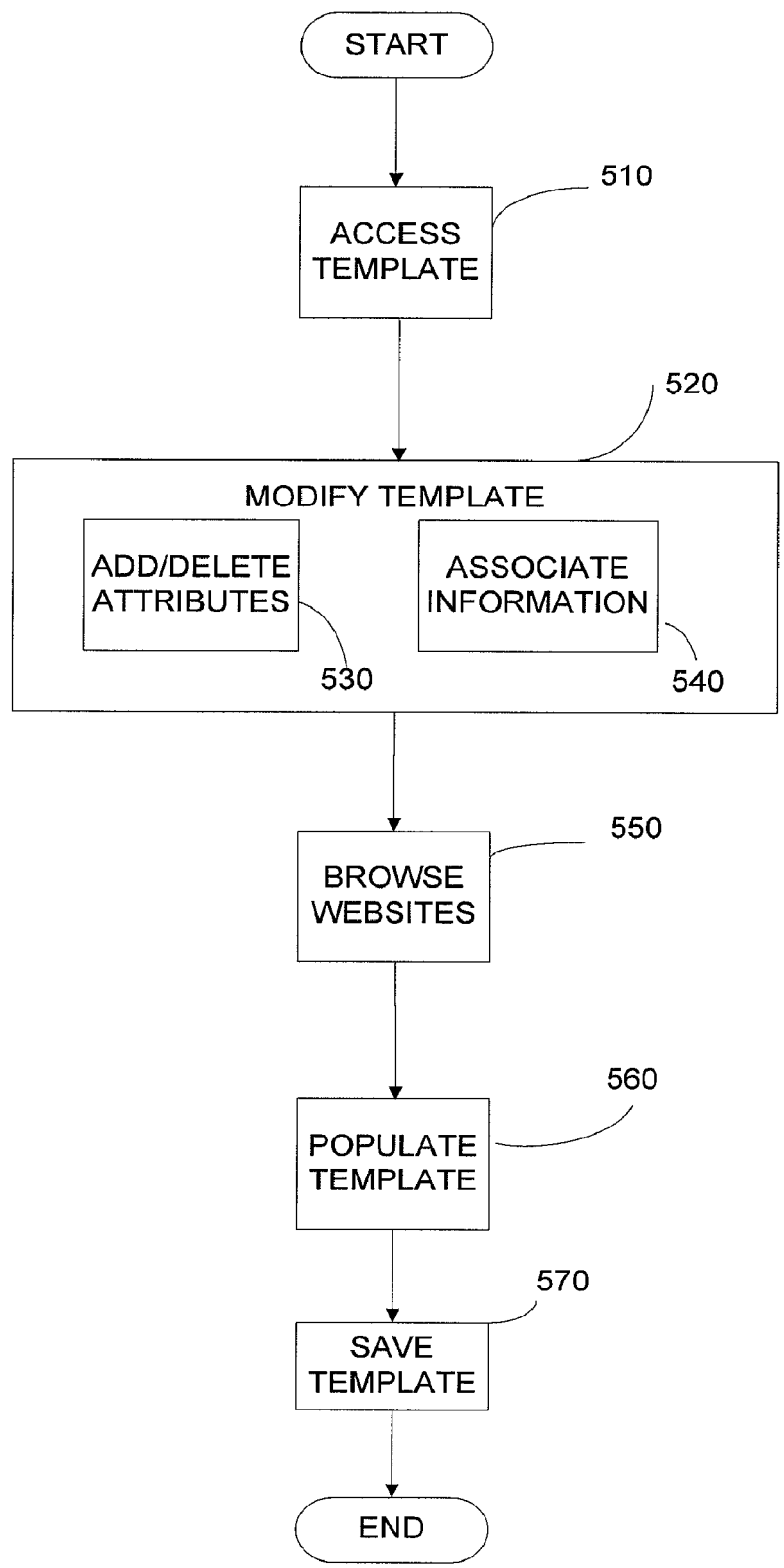
FIG. 5 is a flow chart of a method for researching an item using a research template in accordance with one embodiment of the invention.

In one embodiment, a method for researching an item using a pre-defined template is shown in FIG. 5. In act 510, a first user in the community may connect to a web server and select a template created by a different user in the community as a starting point. Then the user may modify one or more of the attributes in the template to create a new template (act 520). Modifying may include adding one or more new attributes to the template and/or deleting one or more pre-existing attributes from the template to reflect the set of attributes that the first user identifies as important to his/her research (act 530). Modifying may also include associating information with an attribute in the template (act 540). The user may then browse one or more websites (act 550) to collect data from the one or more web pages to populate the template (act 560) in any appropriate manner as described above. The modified template, along with any associated data that the user would like to share with other members of the community, may be saved to the repository for use by other community members (act 570).

Some illustrative embodiments described above use one or more computers for conducting web-based research. It should be understood that the term computer as used herein may refer to a general purpose programmable computer (e.g., a desktop or laptop computer), a wireless telephone, a PDA, or any other device including a processor.

Figure 6:
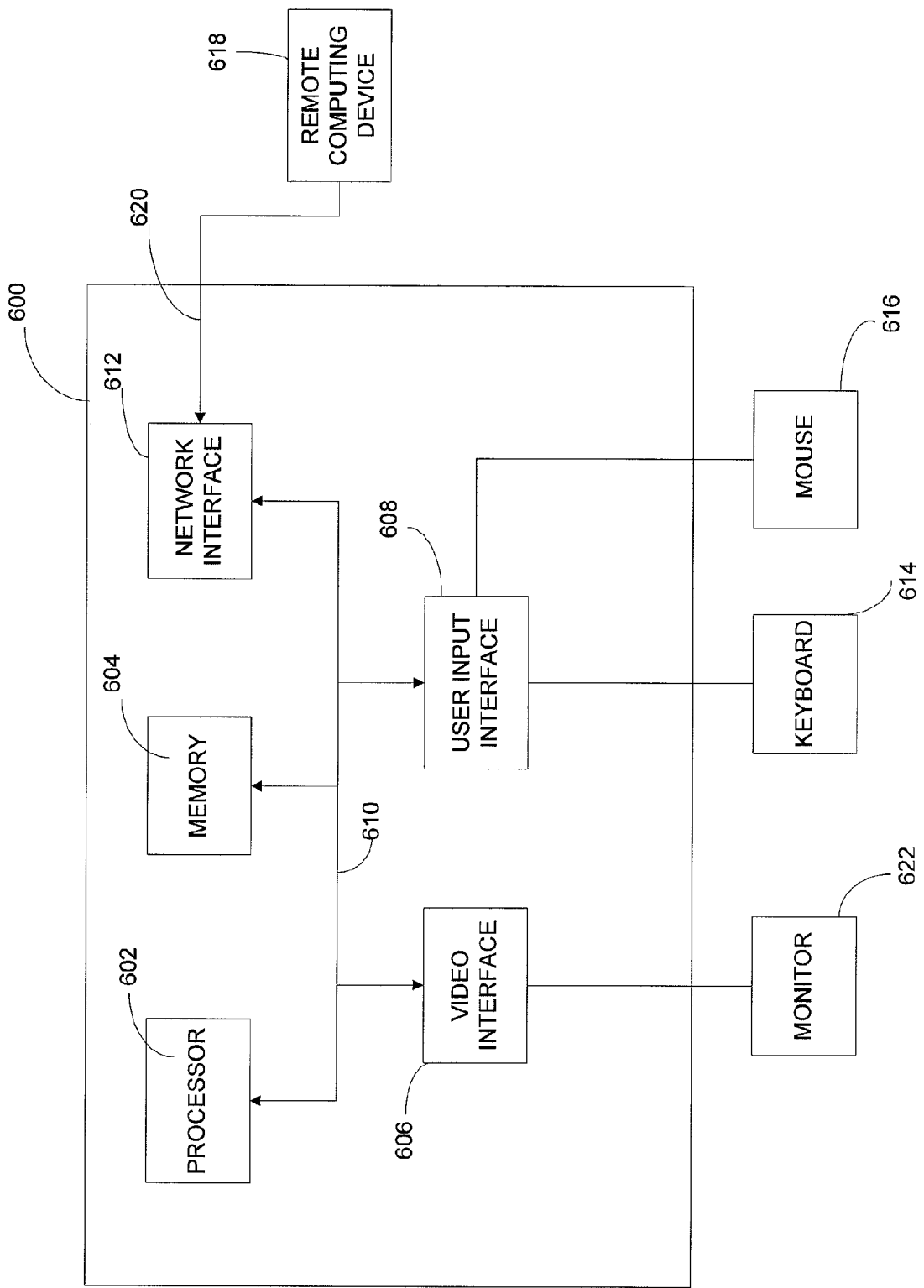
FIG. 6 is a schematic block diagram of a computer on which embodiments of the invention may be implemented.

FIG. 6 shows a schematic block diagram of an illustrative computer 600 on which aspects of the invention may be implemented. Only illustrative portions of the computer 600 are identified for purposes of clarity and not to limit aspects of the invention in any way. For example, the computer 600 may include one or more additional volatile or non-volatile memories, one or more additional processors, any other user input devices, and any suitable software or other instructions that may be executed by the computer 600 so as to perform the function described herein.

In the illustrative embodiment, the computer 600 includes a system bus 610, to allow communication between a central processing unit 602, a memory 604, a video interface 606, a user input interface 608, and a network interface 612. The network interface 612 may be connected via network connection 620 to at least one remote computing device 618. Peripherals such as a monitor 622, a keyboard 614, and a mouse 616, in addition to other user input/output devices may also be included in the computer system, as the invention is not limited in this respect.

Aspects of the invention, including embodiments described above, can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of embodiments in accordance with aspects of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention. It should be appreciated that in accordance with several embodiments of the present invention wherein processes are implemented in a computer readable medium, the computer implemented processes may, during the course of their execution, receive input manually (e.g., from a user).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of conducting web-based research on at least one item, the at least one item comprising at least one product and/or at least one service, the method being performed by a first user in a community of consumers, wherein the method comprises acts of:
   (A) accessing a previously populated research template for the at least one item, wherein the research template is a data structure configured to store data related to a plurality of attributes for evaluating the at least one item, wherein the research template is accessible to and modifiable by users in the community of consumers to facilitate a collaborative researching experience for the at least one item, the template comprising at least one field relating to the plurality of attributes for evaluating the at least one item, the plurality of attributes having been specified by at least one other user in the community of consumers, the at least one field being populated with results of research conducted on the at least one item by the at least one other user in the community of consumers, the results comprising the data collected from at least one website;
   (B) modifying the research template by modifying at least one of the plurality of attributes;
   (C) populating, using at least one processor, the modified template with data collected from a plurality of websites;
   (D) associating with at least some of the plurality of attributes priority information indicating a relative importance among the at least some of the plurality of attributes; and
   (E) organizing the populated modified template based on the priority information.

2. The method of claim 1, further comprising an act of:
   saving the populated modified template to a repository that is available to the community of consumers comprising the first user and the at least one other user.

3. The method of claim 1, wherein the act of modifying at least one of the plurality of attributes comprises adding a new attribute to the template.

4. The method of claim 1, wherein the act of modifying at least one of the plurality of attributes comprises deleting an attribute from the template.

5. The method of claim 1, further comprising an act of:
   storing information identifying each of a plurality of websites from which data is collected.

6. A method of facilitating web-based research on at least one item, the at least one item comprising at least one product and/or at least one service, the method comprising acts of:
   (A) providing a first user in a community of consumers for the at least one item access to a previously populated research template for the at least one item, wherein the research template is a data structure configured to store data related to a plurality of attributes for evaluating the at least one item, wherein the research template is accessible to and modifiable by users in the community of consumers to facilitate a collaborative researching experience for the at least one item, the template comprising at least one field relating to the plurality of attributes for evaluating the at least one item, at least one of the plurality of attributes having been specified by at least one other user in the community of consumers, the at least one field being populated with results of research conducted on the at least one item by the at least one other user in the community of consumers, the results comprising the data collected from at least one website;
   (B) in response to at least one instruction from the first user, modifying the research template by modifying at least one of the plurality of attributes;
   (C) in response to at least one action by the first user, populating, using at least one processor, the modified template with data collected from a plurality of websites;
   (D) in response to at least one instruction from the user, associating with at least some of the plurality of attributes priority information indicating a relative importance among the at least some of the plurality of attributes; and
   (E) organizing the populated modified template based on the priority information.

7. The method of claim 6, further comprising an act of:
   in response to at least one instruction from the first user, saving the populated modified template to a repository that is available to the community of consumers comprising the first user and the at least one other user.

8. The method of claim 6, wherein the act of modifying at least one of the plurality of attributes comprises adding a new attribute to the template.

9. The method of claim 6, wherein the act of modifying at least one of the plurality of attributes comprises deleting an attribute from the template.

10. The method of claim 6, further comprising an act of:
    storing information identifying each of a plurality of websites from which data is collected.

11. A computer readable storage medium encoded with instructions that, when executed on a computer, perform a method of facilitating web-based research on at least one item, the at least one item comprising at least one product and/or at least one service, the method comprising acts of:

(A) providing a first user in a community of consumers for the at least one item access to a previously populated research template for the at least one item, wherein the research template is a data structure configured to store data related to a plurality of attributes for evaluating the at least one item, wherein the research template is accessible to and modifiable by users in the community of consumers to facilitate a collaborative researching experience for the at least one item, the template comprising at least one field relating to the plurality of attributes for evaluating the at least one item, at least one of the plurality of attributes having been specified by at least one other user in the community of consumers, the at least one field being populated with results of research conducted on the at least one item by the at least one other user in the community of consumers, the results comprising data collected from at least one website;

(B) in response to at least one instruction from the first user, modifying the research template by modifying at least one of the plurality of attributes;

(C) in response to at least one action by the first user, populating the modified template with data collected from a plurality of websites;

(D) in response to at least one instruction from the first user, associating with at least some of the plurality of attributes priority information indicating a relative importance among the at least some of the plurality of attributes; and (E) organizing the populated modified template based on the priority information.

12. The computer readable storage medium of claim 11, wherein the method further comprises an act of:

in response to at least one instruction from the first user, saving the populated template to a repository that is available to the community of consumers comprising the first user and the at least one other user.

13. The computer readable storage medium of claim 11, wherein the act of modifying at least one of the plurality of attributes comprises adding a new attribute to the template and/or deleting an attribute from the template.

14. The computer readable storage medium of claim 11, wherein the method further comprises an act of:

storing information identifying each of a plurality of websites from which data is collected.

* * * * *